United States Patent [19]

Miki et al.

[11] 4,054,616

[45] Oct. 18, 1977

[54] PROCESS FOR PRODUCING TRANSPARENT BLOCK COPOLYMER RESINS

[75] Inventors: Tamotsu Miki; Shizuo Narisawa; Ichiro Ichikawa; Hideki Horiike, all of Ichihara, Japan

[73] Assignee: Sumitomo Chemical Company, Limited, Osaka, Japan

[21] Appl. No.: 685,129

[22] Filed: May 10, 1976

Related U.S. Application Data

[63] Continuation of Ser. No. 508,743, Sept. 24, 1974, abandoned.

[30] Foreign Application Priority Data

Sept. 29, 1973 Japan ............................... 48-109946
Oct. 5, 1973 Japan ............................... 48-112593

[51] Int. Cl.² .............................................. C08L 9/06
[52] U.S. Cl. ................................................. 260/880 B
[58] Field of Search ...................................... 260/880 B

[56] References Cited

U.S. PATENT DOCUMENTS

| 3,251,905 | 5/1966 | Zelinski | 260/880 B |
| 3,449,306 | 6/1969 | Zelinski | 260/880 B |
| 3,778,490 | 12/1973 | Hsieh | 260/880 B |
| T953,011 | 12/1976 | Smith | 260/880 |

Primary Examiner—Paul R. Michl
Attorney, Agent, or Firm—Stevens, Davis, Miller & Mosher

[57] ABSTRACT

A block copolymer resin having at one or both ends a copolymer block of a vinyl aromatic compound and a conjugated diene is obtained by subjecting a vinyl aromatic compound and a conjugated diene to 2- or 3-stage block copolymerization in a hydrocarbon solvent in the presence of a definite amount of a Lewis base compound using an organolithium compound as an initiator. The block copolymer resin is high in transparency and excellent in mechanical properties, and is successfully usable in the fields of sheets, films and various molded articles.

25 Claims, 1 Drawing Figure

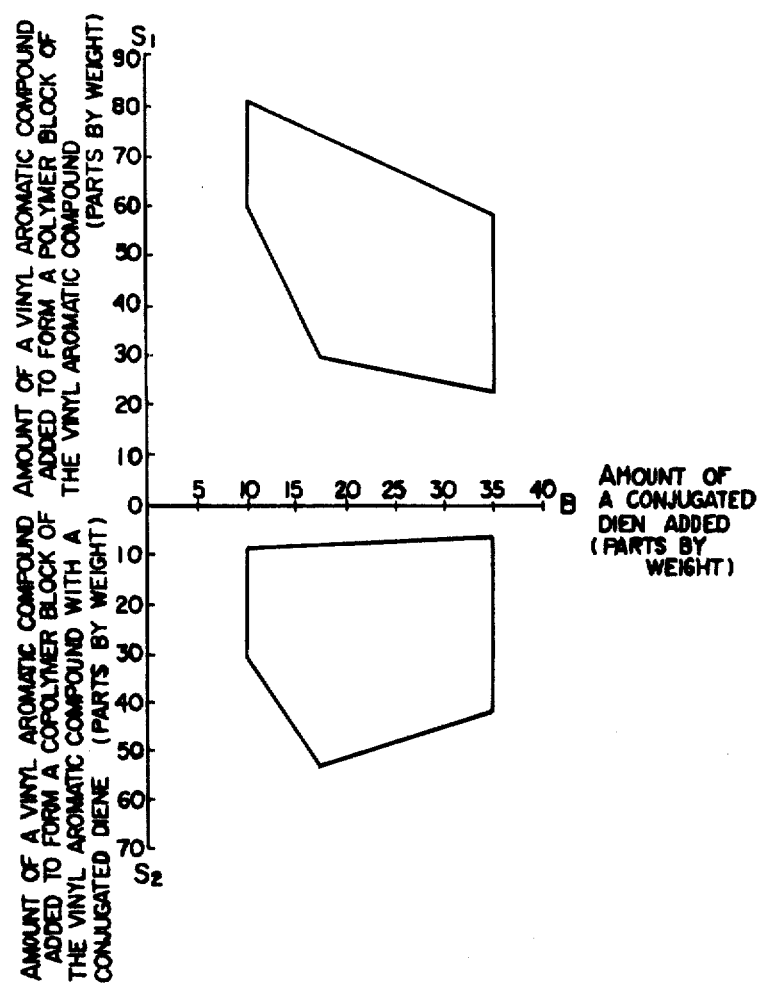

PROCESS FOR PRODUCING TRANSPARENT BLOCK COPOLYMER RESINS

This is a continuation of application Ser. No. 508,743 filed Sept. 24, 1974, now abandoned.

This invention relates to a process for producing a novel block copolymer resin high in transparency and excellent in mechanical properties. More particularly, the invention is concerned with a process for producing a transparent block copolymer resin excellent in mechanical properties, particularly in elongation and impact strength, by copolymerizing in 2 or 3 stages in a specific order a vinyl aromatic compound monomer with a conjugated diene monomer in a hydrocarbon solvent using an organolithium compound as an initiator.

It has heretofore been known that various block copolymers different in structure can be obtained by copolymerizing vinyl aromatic compounds with conjugated dienes using as initiators alkali metals or organic alkali metal compounds. For example, Japanese Patent Publication Nos. 19,286/61 and 2,423/73 disclose processes for producing transparent resins by subjecting styrene, butadiene and the like monomers to 2-stage block copolymerization, and Japanese Patent Publication Nos. 3,252/72 and 28,915/72 disclose processes for producing transparent resins by subjecting the same monomers as above to 4- or 5-stage block copolymerization. Further, Japanese Patent Publication No. 20,038/73, German Patent Application Laid-Open No. 2,120,232 and Japanese Patent Application Laid-Open (Kokai) No. 7,597/71 propose processes for producing transparent resins by subjecting the same monomers as above to 1-stage copolymerization.

It is well known that a 3-blocked copolymer having at the center a block composed of a polymer of a conjugated diene such as butadiene and having at each of the both terminals a block composed of a polymer of a vinyl aromatic compound such as styrene, which copolymer is obtained by 2-stage bifunctional living copolymerization according to any of the above-mentioned processes using as an initiator an aromatic compound having two lithium atoms bonded thereto, for example, is practically insufficient in impact strength unless the feed weight ratio of styrene/butadiene is less than 75/25 (refer to Example 11 of the aforesaid Japanese Patent Publication No. 19,286/61). It is also well known that according to a process in which the same monomers as above are subjected to 2-stage monofunctional living copolymerization in an inert hydrocarbon solvent free from polar compound using an organo-monolithium compound as an initiator (refer to the aforesaid Japanese Patent Publication No. 2,423/73), the resulting copolymer resin is not always sufficiently satisfactory in mechanical properties, in practice. Further, in a process for producing a multi-block copolymer having 5 to 7 blocks by multi-stage copolymerization in a hydrocarbon solvent using an organic alkali metal compound as an initiator, not only the polymerization operation becomes complex but also the number of terminals inactivated at each stage becomes larger to make smooth progress of the polymerization difficult, with the result that block copolymers having structures other than the desired structure migrate undesirably into the resulting copolymer to injure the transparency and mechanical properties of the resin. On the other hand, in a process in which, in an attempt to carry out the stage-wise copolymerization at one stage, a mixture of monomers such as styrene and butadiene is polymerized at one stage using as an initiator the reaction product of lithium metal with a non-condensed polycyclic aromatic compound (refer to the aforesaid German Patent Application Laid-Open (Kokai) No. 2,120,232), there are encountered such difficulties that the initiator is to be synthesized in a polar compound such as ether while the polymerization reaction is to be conducted in an inert hydrocarbon solvent free from polar compound, with the result that marked commercial disadvantages are necessarily brought about.

With an aim to develop a process for producing with commercial advantages a transparent resin excellent in mechanical properties by using as starting materials a vinyl aromatic compound monomer and a conjugated diene monomer; the present inventors made extensive studies to find that a copolymer resin capable of satisfying the above-mentioned requirements can be obtained according to one- or both-terminal initiation type multistage polymerization using an organolithium compound as an initiator by controlling the feed ratio of the monomers added at each stage to a specified range and by making a definite amount of a Lewis base compound present in the polymerization system. Based on this finding, the inventors have accomplished the present invention.

An object of the present invention is to provide block copolymer resins which are high in transparency and excellent in mechanical properties consisting of 2 or 3 blocked copolymer and the process for producing same.

Other objects and advantages of the present invention will become apparent from the descriptions below.

The accompanying drawing diagrammatically shows the ranges of feed weight proportions of the monomers used in the polymerization process of the present invention.

In the drawing, $S_1$ represents the feed amount (parts by weight) of a vinyl aromatic compound added to form a polymer block of the vinyl aromatic compound; $S_2$ the feed amount (parts by weight) of a vinyl aromatic compound added to form a copolymer block of the vinyl aromatic compound and a conjugated diene; and B the feed amount (parts by weight) of a conjugated diene.

According to the present invention, a block copolymer resin consisting of 2 or 3 blocks can be obtained by subjecting 90 to 65 parts by weight of a vinyl aromatic compound monomer and 10 to 35 parts by weight of a conjugated diene monomer to 2- or 3-stage block copolymerization in a hydrocarbon solvent using an organolithium compound as an initiator, thereby forming a 2-blocked copolymer having a block composed of a polymer of the vinyl aromatic compound and a copolymer block of the vinyl aromatic compound and the conjugated diene, or a 3-blocked copolymer having at the center a block composed of a polymer of the vinyl aromatic compound and having at each of the both terminals a copolymer block of the vinyl aromatic compound and the conjugated diene.

In one mode, the present invention provides a process for producing a transparent block copolymer resin excellent in mechanical properties which comprises subjecting 90 to 65 parts by weight of a vinyl aromatic compound monomer and 10 to 35 parts by weight of a conjugated diene monomer to 2-stage block copolymerization in an inert hydrocarbon solvent using an organomonolithium compound as an initiator, characterized in that at the first stage of polymerization, $S_1$ parts by weight of the vinyl aromatic compound monomer is added and substantially all of the monomer is polymerized, and then, at the second stage of polymerization, a mixture of $S_2$ parts of the vinyl aromatic compound monomer and B parts by weight of the conjugated diene monomer is added and substantially all of the monomers are polymerized, or the order of addition of the monomers at the first and second stages is made reverse to the above-mentioned order, wherein the feed weight ratios of the individual monomers are controlled to the ranges of:

$S_1 + S_2 = 90$ to 65 (parts by weight)

$B = 10$ to 35 (parts by weight)

$S_1/(S_1 + S_2) = 0.35$ to 0.90

$S_2/B = 0.2$ to 3.0 and the polymerization is effected in the presence of a Lewis base commpound in a proportion of 0.01 to 5 mole % based on the total monomer.

In another mode, the present invention provides a process for producing a novel block copolymer resin which comprises subjecting 90 to 65 parts by weight of a vinyl aromatic compound monomer and 10 to 35 parts by weight of a conjugated diene monomer to 3-stage block copolymerization in an inert hydrocarbon solvent using an organo-monolithium compound as an initiator, characterized in that at the first stage of polymerization, a mixture of $S_1$ parts by weight of the vinyl aromatic compound monomer and $B_1$ parts by weight of the conjugated diene monomer is polymerized and substantially all of the monomers are polymerized; at the second stage of polymerization, $S_2$ parts by weight of the vinyl aromatic compound monomer is added and the polymerization is continued to polymerize substantially all of the monomers; and at the third stage of polymerization, a mixture of $S_3$ parts by weight of the vinyl aromatic compound monomer and $B_3$ parts by weight of the conjugated diene monomer is added and the polymerization is continued to polymerize substantially all of the monomers, wherein the feed weight ratios of the individual monomers are controlled to satisfy the relation:

$S_1 + S_2 + S_3 = 90$ to 65 (parts by weight)

$B_1 + B_3 = 10$ to 35 (parts by weight)

$S_1/B_1 = 0.2$ to 3.0

$S_3/B_3 = 0.2$ to 3.0

$S_2/(S_1 + S_2 + S_3) = 0.35$ to 0.90 and the polymerization is effected in the presence of a Lewis base compound in a proportion of 0.01 to 5 mole % based on the total monomer, thereby producing a block copolymer having at the center a non-elastomeric block composed of a polymer of the vinyl aromatic compound and at each of the both terminals an elastomeric copolymer block composed mainly of the conjugated diene and the vinyl aromatic compound.

In still another mode, the present invention provides a process for producing a novel block copolymer resin which comprises subjecting 90 to 65 parts by weight of a vinyl aromatic compound monomer and 10 to 35 parts by weight of a conjugated diene monomer to 2-stage block copolymerization in an inert hydrocarbon solvent using an organo-dilithium compound as an initiator, characterized in that at the first stage of polymerization, $S_1$ parts by weight of the vinyl aromatic compound monomer is added and substantially all of the monomer is polymerized, and then, at the second stage of polymerization, a mixture of $S_2$ parts by weight of the vinyl aromatic compound monomer and B parts by weight of the conjugated diene monomer is added and the polymerization is continued to polymerize substantially all of the monomers, wherein the feed weight ratios of the individual monomers are controlled to values within the ranges of:

$S_1 + S_2 = 90$ to 65 (parts by weight)

$B = 10$ to 35 (parts by weight)

$S_1/(S_1 + S_2) = 0.35$ to 0.90

$S_2/B = 0.2$ to 3.0 and the polymerization is effected in the presence of a Lewis base compound in a proportion of 0.01 to 5 mole % based on the total monomer, thereby producing a block copolymer resin having at the center a non-elastomeric block composed of a polymer of the vinyl aromatic compound and having at each of the both terminals an elastomeric copolymer block composed mainly of the conjugated diene and the vinyl aromatic compound.

As mentioned above, the process of the present invention can be easily practiced on commercial scale.

Moreover, block copolymer resins obtained by the process of the present invention are characteristically high in transparency, excellent in mechanical properties and easily moldable, and can be widely applied to the fields in which resins are used.

The modes of practice of the present invention are explained in detail below.

The vinyl aromatic compound used in the present invention includes styrene, α-methylstyrene, vinylnaphthalene and nucleus-substituted styrene such as vinyltoluene, and mixtures thereof. The conjugated diene includes 1,3-butadiene, isoprene, piperylene, substituted butadienes such as 2,3-dimethyl-1,3-butadiene and 1-phenyl-1,3-butadiene, and mixtures thereof. Particularly, the use of styrene as the vinyl aromatic compound and butadiene as the conjugated diene is preferable in view of the utilizability and effectiveness of the resulting copolymer resin.

The proportions of the monomers used in the process of the present invention are 90 to 65 parts by weight of the vinyl aromatic compound and 10 to 35 parts by weight of the conjugated diene. If the proportion of the vinyl aromatic compound is more than 90 parts by weight, the resulting resin is undesirably lowered particularly in elongation and impact strength, while if the proportion thereof is less than 65 parts by weight, the resulting resin in undesirably lowered in tensile strength, stiffness and softening point.

In the process of the present invention, there is formed at one or both terminals an elastomeric block composed of a copolymer of the vinyl aromatic compound with the conjugated diene. The amount of the vinyl aromatic compound to be added at this stage should be in the range from 0.2 to 3.0 times the weight of the conjugated diene added at the same stage, and the amount of the vinyl aromatic compound, which is added to form a non-elastomeric block at the center or at one end, should be in a weight ratio in the range from 0.35 to 0.90 to the total feed amount of the vinyl aromatic compound. If the feed amounts of the monomers added at individual stages of polymerization exceed the ranges specified by the present invention, the resulting resin is undesirably deteriorated in mechanical properties, particularly in the balance between tensile strength and elongation, and in impact strength or moldability.

The inert hydrocarbon solvent used in the process of the present invention includes aromatic hydrocarbons such as benzene, toluene, xylene and ethylbenzene, aliphatic hydrocarbons such as pentane, hexane and heptane, and alicyclic hydrocarbons such as cyclopentane, cyclohexane and methylcyclohexane. These may be used either singly or in the form of a mixture of two or more members. The amount of the hydrocarbon solvent to be used is ordinarily 1 to 20 parts by weight per part by weight of the total monomer. The solvent and the aforesaid monomers should have sufficiently been freed prior to use from water, oxygen, carbon dioxide, certain sulfur compounds, acetylenes and the like substances which degrade the initiator used in the present invention or destroy the active terminals formed.

The organo-monolithium compound used in the process of the present invention is an alkyl, cycloalkyl or aryl lithium compound having 2 to 20 carbon atoms. Concrete examples of such compound include ethyllithium, propyllithium, butyllithium, amyllithium, hexyllithium, 2-ethylhexyllithium, cyclohexyllithium, decyllithium, dodecyllithium, phenyllithium, tolyllithium, xylyllithium and naphthyllithium. These may be used either singly or in the form of a mixture of two or more members. The amount of the organomonolithium compound to be used is 0.005 to 5 mole %, preferably 0.01 to 1.5 mole %, based on the total monomer.

The organo-dilithium compound used in the process of the present invention is a so-called both-terminal initiation type organo-dilithium compound. Concrete examples of such compound include alkylene dilithium compounds such as trimethylenedilithium, tetramethylenedilithium and pentamethylenedilithium, and complexes formed by reacting a condensed or noncondensed polycyclic aromatic compound with lithium metal in a Lewis base solvent such as an ether compound. Examples of said complexes are naphthalenelithium, stilbene-lithium and biphenyl-lithium complexes. It is also possible to use a compound prepared by reacting any of the said complexes comprising a condensed or non-condensed polycyclic aromatic compound and lithium with a small amount of a conjugated diene to form a hydrocarbon dianion soluble in a hydrocarbon solvent in the form of a trimer or tetramer, and then removing by distillation or without removing the Lewis base solvent such as ether compound used in preparation of the complex and substituting the said solvent with an inert hydrocarbon solvent. The use of this kind of initiator is particularly preferable. The above-mentioned organo-dilithium compounds may be used either singly or in the form a mixture of two or more members. The amount of the organo-dilithium compound to be used is 0.02 to 3 mole %, preferably 0.01 to 1.5 mole %, based on the total monomer mixture.

In the process of the present invention, a mixture of the vinyl aromatic compound and the conjugated diene is added at either stage of polymerization to form an elastomeric copolymer block. For smooth formation of the elastomeric copolymer block, there is used a specific amount of Lewis base compound such as an ether compound or a tertiary amine compound. Examples of the ether compound include cyclic ethers such as tetrahydrofuran and tetrahydropyran, aliphatic monoethers such as diethyl ether and dibutyl ether, aliphatic polyethers such as diethyleneglycol-dimethylether and diethyleneglycol-diethyl-ether, and mixtures thereof. Examples of the tertiary amine compound include triethylamine, tripropylamine, tributylamine, N,N'-dimethylaniline, pyridine and mixtures thereof. The amount of the Lewis base compound to be used is 0.01 to 5 mole %, preferably 0.05 to 2 mole %, based on the total monomer. If the amount of the Lewis base compound is excessively more than the above-mentioned range, the content of vinyl bond in the elastomeric copolymer block greatly increases to make the glass transition temperature Tg of the copolymer higher, whereby the resin is undesirably deteriorated in mechanical properties and low temperature characteristics. Conversely, if the amount of the Lewis base compound is excessively less than the above-mentioned range, copolymerization of the vinyl aromatic compound with the conjugated diene cannot be effected smoothly to cause such phenomenon that at the initial stage, only the conjugated diene is chiefly polymerized, while at the latter stage, only the vinyl aromatic compound is chiefly polymerized, with the result that the resulting block copolymer resin is deteriorated to a great extent in mechanical properties, particularly in elongation and impact strength.

The time of addition of the Lewis base compound is not particularly limited, and may be any time prior to the stage at which the copolymer block is formed.

In one mode of the 2-stage polymerization according to the present invention, $S_1$ parts by weight of the vinyl aromatic compound monomer is added at the first stage of polymerization and substantially all of the monomer is polymerized in the presence of an organomonolithium compound to form a non-elastomeric block. Subsequently, at the second stage of polymerization, a mixture of $S_2$ parts by weight of the vinyl aromatic compound monomer and B parts by weight of the conjugated diene monomer is added and the polymerzation is continued to form an elastomeric block composed mainly of a copolymer of the vinyl aromatic compound with the conjugated diene. In this case, it is needless to say that the proportions of the individual monomer added at the first and second stages of polymerization should satisfy, as mentioned previously, the following conditions:

$S_1 + S_2 = 90$ to 65 (parts by weight)

$B = 10$ to 35 (parts by weight)

$S_1/(S_1 + S_2) = 0.35$ to 0.90

$S_2/B = 0.2$ to 3.0

It is undesirable to add and polymerize only the conjugated diene at the second stage of polymerization to form as the elastomeric block a block composed of a polymer of only the conjugated diene, because the resulting block copolymer resin is greatly deteriorated in mechanical properties, particularly in elongation. Alternatively, a mixture of the vinyl aromatic compound and the conjugated diene may be added and polymerized at the first stage of polymerization, and then the remaining vinyl aromatic compound may be added and polymerized at the second stage of polymerization. In this case also, it is of course necessary that the weight proportions of the individual monomers should satisfy the above-mentioned conditions.

In another mode of the 2-stage polymerization according to the present invention, $S_1$ parts by weight of the vinyl aromatic compound monomer is added at the first stage of polymerization and substantially all of the monomer is polymerized in the presence of a both terminal-initiation type organo-dilithium compound to form at the center a non-elastomeric block. Subsequently, at the second stage of polymerization, a mixture of $S_2$ parts by weight of the vinyl aromatic compound monomer and B parts by weight of the conjugated diene monomer is added and the polymerization is continued to form at each terminal an elastomeric block composed mainly of a copolymer of the conjugated diene with the vinyl aromatic compound. In this case, it is needless to say that the proportions of the monomers added at the first and second stages of polymerization should satisfy, as mentioned previously, the following conditions:

$S_1 + S_2 = 90$ to 65 (parts by weight)

$B = 10$ to 35 (parts by weight)

$S_1/(S_1 + S_2) = 0.35$ to 0.90

$S_2/B = 0.2$ to 3.0

It is undesirable to add and polymerize only the conjugated diene at the second stage of polymerization to form as the elastomeric block at each terminal a block composed of a polymer of only the conjugated diene, because the resulting block copolymer resin is greatly deteriorated in mechanical properties, particularly in elongation.

In the 3-stage polymerization, which is still another mode of the present invention, a mixture of $S_1$ parts by weight of the vinyl aromatic compound monomer and $B_1$ parts by weight of the conjugated diene monomer is added at the first stage of polymerization and polymerized in the presence of an organo-monolithium compound and a Lewis base compound to form an elastomeric copolymer block, and then at the second stage of polymerization, $S_2$ parts by weight of the vinyl aromatic compound monomer is added and the polymerization is continued to form a non-elastomeric block. Subsequently, at the third stage of polymerization, a mixture of $S_3$ parts by weight of the vinyl aromatic compound monomer and $P_3$ parts by weight of the conjugated diene monomer is added and the polymerization is continued to form an elastomeric copolymer block. In this case, it is needless to say that the proportions of the individual monomers added at the first, second and third stages of polymerization should satisfy, as mentioned previously, the following conditions:

$S_1 + S_2 + S_3 = 90$ to 65 (parts by weight)

$B_1 + B_3 = 10$ to 35 (parts by weight)

$S_1/B_1 = 0.2$ to 3.0

$S_3/B_3 = 0.2$ to 3.0

$S_2/(S_1 + S_2 + S_3) = 0.35$ to 0.90

It is undesirable to add and polymerize only the conjugated diene at the first and third stages of polymerization to form as the elastomeric block at each terminal a block composed of a polymer of only the conjugated diene, because the resulting resin is greatly deteriorated in mechanical properties, particularly in elongation.

In the multi-stage polymerization according to the present invention, the monomers added at the individual stages can be polymerized to substantially 100%, so that the yield of the resulting copolymer can be substantially 100%.

In the polymerization of the present invention, the average molecular weight of the resulting copolymer resin is controlled by the amount of the initiator used. The average molecular weight of the block copolymer according to the present invention should have a value in the range from 0.5 to 1.8 dl/g in terms of intrinsic viscosity ($\eta$) as measured in toluene solution at 30° C. If the molecular weight of the copolymer is so low as to show an intrinsic viscosity of less than 0.5 dl/g, the resin is undesirably deteriorated in mechanical properties, while if the molecular weight of the copolymer is so high as to show an intrinsic viscosity of more than 1.8 dl/g, the resin is undesirably deprived of transparency and becomes quite difficultly moldable.

The polymerization of the present invention is carried out at a temperature in the range from $-20°$ to 150° C., preferably from 20° to 120° C. The pressure is selected from pressures sufficient to maintain the monomers and the solvent at the liquid phase at a temperature within the above-mentioned range. The polymerization time varies depending on the polymerization conditions but is less than 48 hours, ordinarily less than 24 hours. The time of addition of the monomers at each of the second and third stage is not particularly limited and may be any time after the conversion at the preceding step has reached substantially 100%.

After completion of the polymerization, the resulting copolymer may be precipitated and recovered by adding to the system water, methanol, isopropanol or the like compound in an amount sufficient to inactivate the active terminal, further adding, if necessary, a small amount of an antioxidant, e.g. 4-methyl-2,6-di-tert-butylphenol and then adding excess methanol, ethanol, isopropanol or the like. Alternatively, the copolymer may be recovered by directly heating the polymerization liquid to dryness or by mixing the polymerization liquid with steam to remove the solvent.

The block copolymers according to the present invention may be processed by ordinary processing operation and may be used in fields where conventional resins have been used. Further, the copolymers of the present invention may be incorporaed by ordinary procedures with various additives such as stabilizers, reinforcing agents, fillers, and various additives which have heretofore been employed.

As mentioned above, the present invention provides a process for producing novel block copolymer resins high in transparency and excellent in mechanical properties by subjecting 90 to 65 parts by weight of a vinyl aromatic compound monomer and 10 to 35 parts by weight of a conjugated diene monomer to multi-stage polymerization using an organolithium compound as an initiator. The process of the present invention is easily practicable on commercial scale, and, moreover, the resins obtained by the process of the present invention are high in transparency and excellent in mechanical properties, and hence can successfully be used not only the fields where the conventional resins have been used but also in the fields where the conventional resins have not successfully been usable. Thus, the industrial value of the present invention is extremely high.

The modes of practice of the present invention are illustrated in detail below with reference to examples, but the invention is not limited to the examples, and various modifications are possbile within the scope of the invention.

EXAMPLE 1

Into a 2.5-liters pressure glass autoclave, which had internally been flushed with argon gas, were charged 1.5 liters of purified, dried and degassed benzene and 300 g. of purified and dried styrene. Subsequently, a hexane solution of n-butyllithium was dropped into the autoclave until an orange color of the active terminals of polystyryllithium was observed in the content of the autoclave, and then 4.0 mmol. of n-butyllithium and 0.90 g. of tetrahydrofuran were further added to the autoclave. Immediately thereafter, the autoclave was heated to 60° C., and the mixture in the autoclave was continuously stirred at said temperature for 3 hours to carry out the first stage polymerization. Subsequently, 100 g. of styrene and 100 g. of purified and dried butadiene were added to the reaction mixture inside the autoclave, and the resulting mixture was continuously reacted at 60° C. for 3 hours to carry out the second stage polymerization. After 3 hours polymerization, 50 ml. of methanol was added to the system to terminate the polymerization, and the polymerization liquid was charged into methanol incorporated with 4-methyl-2,6-di-tert-butylphenol as an antioxidant, whereby polymer precipitates were deposited. The precipitates were collected by filtration, and then dried in vacuum to obtain a block copolymer in a yield of 99.4%. The copolymer had an intrinsic viscosity of 0.80 dl/g as measured in toluene at 30° C. 100 Parts by weight of the thus obtained copolymer was incorporated with 0.5 part by weight of 4-methyl-2,6-di-tert-butylphenol and 0.5 part by weight of tris-(nonylphenyl)-phosphite as antioxidants, and then pelletized by means of an extruder. The resulting pellets were subjected to injection molding to prepare a test piece for physical property measurement. The molded article was beautiful in appearance and high in transparency. The test piece was measured in physical properties to obtain the results shown in Table 1.

Table 1

| Intrinsic viscosity (dl/g) | (Note 1) | 0.80 |
|---|---|---|
| Tensile strength (kg/cm$^2$) | (Note 2) | 312 |
| Elongation (%) | (Note 2) | 212 |
| Izod impact strength, | | |
| with notch (kg.cm/cm$^2$) | (Note 3) | 2.2 |
| without notch (kg.cm/cm$^2$) | (Note 4) | 16.8 |
| Melt index (g/10 min.) | (Note 5) | 0.48 |

Table 1-continued

| Haze value (%) | (Note 6) | 7.0 |
|---|---|---|

(Note 1) The copolymer before pelletization was measured in toluene at 30° C. using Ubbelohde type viscometer.
(Note 2) Measured at 20° C. with a tensile rate of 5 mm/min. according to JIS-K 6871.
(Note 3) The test piece with notch was measured at 20° C. according to JIS-K 6871.
(Note 4) The test piece without notch was measured at 20° C. according to JIS-K 6871.
(Note 5) Measured according to JIS-K 6760.
(Note 6) Measured according to ASTM-D 1003.

EXAMPLE 2

The polymerization of Example 1 was repeated, except that the amount of tetrahydrofuran was varied to 2.0 g., the monomer added at the first stage was varied to 100 g. of styrene and 100 g. of butadiene, and the monomer added at the second stage was varied to 300 g. of styrene, whereby a block copolymer was obtained in a yield of 99.5%. The thus obtained copolymer was treated in the same manner as in Example 1 to prepare a test piece, which was then measured in physical properties to obtain the results shown in Table 2.

Table 2

| Intrinsic viscosity (dl/g) | 0.82 |
|---|---|
| Melt index (g/10 min.) | 0.22 |
| Tensile strength (kg/cm$^2$) | 333 |
| Elongation (%) | 190 |
| Izod impact strength, | |
| with notch (kg.cm/cm$^2$) | 2.2 |
| without notch (kg.cm/cm$^2$) | 14.5 |
| Haze value (%) | 8.5 |

EXAMPLES 3 - 6

The polymerization of Example 1 was repeated, except that the combination of the monomers and the Lewis base compound were varied to those shown in Table 3, in which were also shown the yields of the copolymers obtained.

Table 3

| Example No. | First stage monomer | Second stage monomer | | Lewis base compound | Polymer yield (%) | Remarks (weight ratio of $S_1$-$S_2$/B) |
|---|---|---|---|---|---|---|
| 3 | Styrene 350 g. | Styrene Butadiene | 50 g. 100 g. | Tetrahydrofuran 0.9 g. | 99.2 | 70–10/20 |
| 4 | Styrene 250 g. | Styrene Butadiene | 150 g. 100 g. | Tetrahydrofuran 0.9 g. | 99.5 | 50–30/20 |
| 5 | Styrene 200 g. | Styrene Butadiene | 200 g. 100 g. | Tetrahydrofuran 0.9 g. | 98.8 | 40–40/20 |
| 6 | Styrene 150 g. | Styrene Butadiene | 250 g. 100 g. | Tetrahydrofuran 0.9 g. | 99.9 | 30–50/20 |

The thus obtained copolymers were treated in the same manner as in Example 1 to prepare test pieces, which were then measured in physical properties to obtain the results shown in Table 4.

Table 4

| Example No. | Intrinsic viscosity (dl/g) | Tensile strength (kg/cm$^2$) | Elongation (%) | Izod impact strength with notch (kg.cm/cm$^2$) | Haze value (%) |
|---|---|---|---|---|---|
| 3 | 0.77 | 377 | 189 | 2.2 | 5.0 |
| 4 | 0.74 | 322 | 169 | 2.2 | 9.0 |
| 5 | 0.72 | 303 | 207 | 2.1 | 8.0 |
| 6 | 1.18 | 340 | 80 | 2.4 | 12.5 |

EXAMPLES 7 - 8

The polymerization of Example 1 was repeated, except that the combination of the monomers and the Lewis base compound were varied to those shown in Table 5.

Table 5

| Example No. | First stage monomer | Second stage monomer | | Lewis base compound | Polymer yield (%) | Remarks (weight ratio of $S_1$-$S_2$/B) |
|---|---|---|---|---|---|---|
| 7 | Styrene 200 g. | Styrene Butadiene | 200 g. 100 g. | Tetrahydrofuran 1.0 g. | 99.5 | 40-40/20 |
| 8 | Styrene 212.5 g. | Styrene Butadiene | 212.5 g. 75 g. | Tetrahydrofuran 1.0 g. | 99.4 | 42.5-42.5/15 |

The thus obtained copolymers were treated in the same manner as in Example 1 to prepare test pieces, which were then measured in physical properties to obtain the results shown in Table 6.

Table 6

| Example No. | Intrinsic viscosity (dl/g) | Tensile strength (kg/cm²) | Elongation (%) | Izod impact strength with notch (kg.cm/cm²) | Haze value (%) |
|---|---|---|---|---|---|
| 7 | 0.81 | 325 | 172 | 2.2 | 11.5 |
| 8 | 0.73 | 351 | 116 | 2.2 | 10.0 |

COMPARATIVE EXAMPLE 1

The polymerization of Example 1 was repeated, except that 400 g. of styrene was used as the first stage monomer and 100 g. of butadiene was used as the second stage monomer, to obtain a block copolymer in a yield of 99.9%. The thus obtained copolymer was treated in the same manner as in Example 1 to prepare a test piece, which was then measured in physical properties to obtain the results shown in Table 7.

Table 7

| Intrinsic viscosity (dl/g) | 0.69 |
|---|---|
| Tensile strength (kg/cm²) | 352 |
| Elongation (%) | 9 |
| Izod impact strength, | |
| with notch (kg.cm/cm²) | 1.8 |
| without notch (kg.cm/cm²) | 8.9 |
| Haze value (%) | 10.0 |

From Table 7, it is clear that when only the conjugated diene is added as the second stage monomer, as seen in Comparative Example 1, to synthesize a 2-blocked copolymer consisting of (1) a polymer block of the vinyl aromatic compound and (2) a polymer block of the conjugated diene, the block copolymer is markedly inferior in mechanical properties, particularly in elongation.

COMPARATIVE EXAMPLES 2 - 3

The same polymerization as in Examples 7 and 8 was repeated, except that the Lewis base compound was not used as shown in Table 8.

Table 8

| Comparative Example No. | First stage monomer | Second stage monomer | | Lewis base compound | Polymer yield | Remarks (weight ratio of $S_1$-$S_2$/B) |
|---|---|---|---|---|---|---|
| 2 | Styrene 200 g. | Styrene Butadiene | 200 g. 100 g. | None | 98.4 | 40-40/20 |
| 3 | Styrene 212.5 g. | Styrene Butadiene | 212.5 g. 75 g. | None | 99.1 | 42.5-42.5/15 |

The thus obtained copolymers were treated in the same manner as in Example 1 to prepare test pieces, which were then measured in physical properties to obtain the results shown in Table 9.

Table 9

| Comparative Example No. | Intrinsic viscosity (dl/g) | Tensile strength (kg/cm²) | Elongation (%) | Izod impact strength with notch (kg.cm/cm²) | Haze value (%) |
|---|---|---|---|---|---|
| 2 | 0.87 | 335 | 15 | 1.8 | 10.5 |
| 3 | 0.68 | 390 | 12 | 1.8 | 8.0 |

From comparison of Comparative Examples 2 and 3 with Examples 7 and 8, it is clear that when the Lewis base compound is used in an amount within the specified range, like in the present invention, the resulting resin is greatly increased in mechanical properties, particularly in elongation.

EXAMPLE 9

The polymerization of Example 2 was repeated, except that the solvent was replaced by 300 ml. of n-hexane and the second stage monomer, i.e., 300 g. of styrene, was continuously added over a period of about 1.5 hours by use of a plunger pump, whereby a block copolymer in the form of a slurry suspended in n-hexane was obtained. The thus obtained copolymer was treated in the same manner as in Example 1 to prepare a test piece, which was then measured in physical properties to obtain the results shown in Table 10.

Table 10

| Intrinsic viscosity (dl/g) | 0.74 |
|---|---|
| Melt Index (g/10 min.) | 1.86 |
| Tensile strength (kg/cm²) | 292 |
| Elongation (%) | 126 |
| Izod impact strength | |
| without notch (kg.cm/cm²) | 50.0 |
| Haze value (%) | 8.0 |

EXAMPLE 10

A 2.5-liters pressure glass autoclave was internally flushed with argon gas, and then charged with 1.5 liters of purified and dried benzene, 50 g. of purified and dried styrene, 50 g. of purified and dried butadiene, 0.9 g. of tetrahydrofuran and 5.0 mmol. of a hexane solution of n-butyllithium as an initiator. Subsequently, the autoclave was heated to 60° C and the mixture in the autoclave was polymerized at said temperature for 2 hours to carry out the first stage polymerization. Thereafter, 300 g. of styrene was added as the second stage monomer, and the polymerization was continued for 2 hours to carry out the second stage polymerization. Subsequently, a mixture of 50 g. of styrene and 50 g. of butadiene was added as the third stage monomer, and the polymerization was further continued for additional 2 hours to carry out the third stage polymerization. Finally, 50 ml. of methanol was added to the system to terminate the polymerization, and the resulting viscous polymerization liquid was charged into a large amount of methanol to deposit polymer precipitates. The precipitates were collected by filtration, and then dried in vacuum to obtain a block copolymer in a yield of 99.1%. The copolymer had an intrinsic viscosity of 0.74 dl/g as measured in toluene at 30° C. 100 Parts by weight of the thus obtained copolymer was incorporated with 0.5 part by weight of 4-methyl-2,6-di-tert-butylphenol and 0.5 part by weight of tris-(nonylphenol)-phosphite as antioxidants, and then pelletized by means of an extruder. The resulting pellets were subjected to injection molding to prepare a test piece for physical property measurement. The molded article was beautiful in appearance and high in transparency. The test piece was measured in physical properties to obtain the results shown in Table 11.

Table 11

| | |
|---|---|
| Intrinsic viscosity (dl/g) | 0.74 |
| Melt index (g/10 min.) | 0.2 |
| Tensile strength (kg/cm$^2$) | 305 |
| Elongation (%) | 190 |
| Izod impact strength, | |
| with notch (kg.cm/cm$^2$) | 2.2 |
| without notch (kg.cm/cm$^2$) | 18.5 |
| Haze value (%) | 8.0 |

EXAMPLES 11 – 15

The polymerization of Example 10 was repeated, except that the combination of the monomers and the amount of the Lewis base compound were varied to those shown in Table 12. The resulting copolymers were treated in the same manner as in Example 10 to prepare test pieces, which were then measured in physical properties to obtain the results shown in Table 13. All the molded articles were transparent and were beautiful in appearance.

COMPARATIVE EXAMPLE 4

The polymerization of Example 10 was repeated, except that the combination of the monomers added at individual stages was varied to the below-mentioned combination, to obtain a block copolymer in a yield of 99.4%.

First stage monomer: Butadiene 50 g.
Second stage monomer: Styrene 400 g.
Third stage monomer: Butadiene 50 g.

The thus obtained copolymer was treated in the same manner as in Example 10 to prepare a test piece, which was then measured in physical properties to obtain the results shown in Table 14.

Table 14

| | |
|---|---|
| Intrinsic viscosity (dl/g) | 0.75 |
| Tensile strength (kg/cm$^2$) | 335 |
| Elongation (%) | 12 |
| Izod impact strength, | |
| with notch (kg.cm/cm$^2$) | 1.8 |
| without notch (kg.cm/cm$^2$) | 8.0 |
| Haze value (%) | 5.0 |

As is clear from Table 14, it is understood that the 3-blocked copolymer having at each terminal a polymer block of the conjugated diene (butadiene) and having at the center a polymer block of the vinyl aromatic compound (styrene) is far inferior in mechanical properties to the block copolymer according to the present invention.

EXAMPLE 16

The oligoisoprenyl-dilithium initiator employed in this Example was synthesized in the following manner:

A 300 ml. four-necked flask was internally flushed with argon gas, and then charged with a dispersion of 0.35 g. (0.05 mole) of lithium metal in 50 ml. of purified and dried tetrahydrofuran. Subsequently, a solution of 6.4 g. (0.05 mole) of naphthalene in 150 ml. of tetrahydrofuran was added through a dropping funnel to the dispersion in the flask with stirring, and the resulting mixture was reacted for 24 hours to synthesize a naph- Table 12

| Example No. | First stage monomer (Note 1) | | Second stage monomer (Note 1) | Third stage monomer (Note 1) | | Lewis base compound | Polymer yield (%) | Remarks $S_1/B_1-S_2-S_3/B_3$ (Note 2) |
|---|---|---|---|---|---|---|---|---|
| 11 | ST | 25 g. | ST 350 g. | ST | 25 g. | Tetrahydrofuran 0.9 g. | 99.5 | 5/10-70-5/10 |
|    | BD | 50 g. |           | BD | 50 g. |                        |      |               |
| 12 | ST | 100 g.| ST 250 g. | ST | 50 g. | Tetrahydrofuran 1.8 g. | 99.2 | 20/10-50-10/10 |
|    | BD | 50 g. |           | BD | 50 g. |                        |      |               |
| 13 | ST | 100 g.| ST 200 g. | ST | 100 g.| Tetrahydrofuran 1.0 g. | 99.8 | 20/10-40-20/10 |
|    | BD | 50 g. |           | BD | 50 g. |                        |      |               |
| 14 | ST | 100 g.| ST 150 g. | ST | 150 g.| Tetrahydrofuran 0.9 g. | 99.7 | 20/10-30-30/10 |
|    | BD | 50 g. |           | BD | 50 g. |                        |      |               |
| 15 | ST | 100 g.| ST 200 g. | ST | 75 g. | Tetrahydrofuran 0.9 g. | 99.7 | 20/15-40-15/10 |
|    | BD | 75 g. |           | BD | 50 g. |                        |      |               |

(Note 1) ST = Styrene, BD = Butadiene
(Note 2) $S_1$, $S_2$, $S_3$, $B_1$ and $B_3$ are weight proportions of the monomers added at each stage of polymerization.

Table 13

| Example No. | Intrinsic viscosity (dl/g) | Tensile strength (kg/cm$^2$) | Elongation (%) | Izod impact strength (kg.cm/cm$^2$) | | Haze value (%) |
|---|---|---|---|---|---|---|
| | | | | With notch | without notch | |
| 11 | 0.76 | 330 | 155 | 2.2 | 15.5 | 5.5 |
| 12 | 0.74 | 305 | 173 | 2.2 | 16.2 | 9.0 |
| 13 | 0.72 | 298 | 191 | 2.1 | 16.7 | 8.0 |
| 14 | 0.84 | 300 | 202 | 2.2 | 17.5 | 7.5 |
| 15 | 0.70 | 285 | 220 | 2.3 | 20.5 | 8.5 | thalene-lithium complex. The reaction liquid was cooled, and 40 ml. of purified isoprene was gradually added thereto while maintaining the temperature at −40° to −50° C. The resulting mixture was reacted at said temperature for about 6 hours, and then the temperature was gradually elevated to room temperature to form a solution of oligoisoprenyl-dilithium. This solution was heated under reduced pressure to remove tetrahydrofuran, and the residue was freshly charged with 400 ml. of purified and dried benzene to obtain a homogeneous solution. The thus obtained benzene solution was subdivided and sealed in ampoules and used as a polymerization initiator.

Using the initiator synthesized in the above manner, the following polymerization according to the present invention was conducted:

A 2.5-liter pressure glass autoclave equipped with a stirrer was internally flushed with argon gas, and then charged with a mixture of 1.5 liters of dehydrated and degassed dry benzene, 240 g. of purified and dried styrene, and 0.72 g. (10 mmol.) of tetrahydrofuran. Subsequently, 100 ml. of the benzene solution of oligoisoprenyl-dilithium initiator synthesized above was injected into the mixture inside the autoclave to initiate the polymerization. The mixture was polymerized at 60° C. for 3 hours to carry out the first stage polymerization. Thereafter, a mixture of 80 g. of styrene and 80 g. of purified and dried butadiene was added as the second stage monomer, and the resulting mixture was reacted at 60° C. for 3 hours to carry out the second stage polymerization. After completion of the second stage polymerization, 50 ml. of methanol was added as a polymerization terminator, and the resulting polymerization liquid was charged into methanol incorporated with 4-methyl-2,6-di-tert-butylphenol as an antioxidant to deposit polymer precipitates. The precipitates were collected by filtration and then dried in vacuum to obtain a block copolymer in a yield of 99.1%. The copolymer had an intrinsic viscosity ($\eta$) of 0.64 dl/g as measured in toluene at 30° C. 100 Parts by weight of the thus obtained copolymer was incorporated with 0.5 part by weight of 4-methyl-2,6-di-tert-butylphenol and 0.5 part by weight of tris-(nonylphenyl)-phosphite as antioxidants, and then pelletized by means of an extruder. The resulting pellets were subjected to injection molding to prepare a test piece for physical property measurement. The molded article was beautiful in appearance and high in transparency. The test piece was measured in physical properties to obtain the results shown in Table 15.

Table 15

| Intrinsic viscosity (dl/g) | 0.64 |
|---|---|
| Tensile strength (kg/cm²) | 298 |
| Elongation (%) | 173 |
| Izod impact strength, | |
| with notch (kg.cm/cm²) | 2.2 |
| without notch (kg.cm/cm²) | 17.5 |
| Haze value (%) | 6.0 |

EXAMPLES 17 - 20

The polymerization of Example 16 was repeated, except that the combination of the monomers and initiator was varied to the combination shown in Table 16, to obtain copolymers. The thus obtained copolymers were treated in the same manner as in Example 16 to prepare test pieces, which were then measured in physical properties to obtain the results shown in Table 17. All the molded articles were high in transparency and beautiful in appearance.

Table 16

| Example No. | Initiator | First stage monomer Styrene (g) | Second stage monomer Styrene (g) | Second stage monomer Butadiene (g) | Polymer yield (wt. %) |
|---|---|---|---|---|---|
| 17 | Oligobutadienyl-dilithium | 240 | 80 | 80 | 99.2 |
| 18 | Oligoisoprenyl-dilithium | 220 | 60 | 120 | 99.8 |
| 19 | Oligoisoprenyl-dilithium | 240 | 100 | 60 | 98.9 |
| 20 | Oligoisoprenyl-dilithium | 200 | 120 | 80 | 99.9 |

Table 17

| Example No. | Intrinsic viscosity (dl/g) | Tensile strength (kg/cm²) | Elongation (%) | Izod impact strength (kg.cm/cm²) With notch | Izod impact strength (kg.cm/cm²) Without notch | Haze value (%) |
|---|---|---|---|---|---|---|
| 17 | 0.74 | 295 | 152 | 2.2 | 16.5 | 8.0 |
| 18 | 0.72 | 260 | 215 | 2.4 | 22.0 | 7.5 |
| 19 | 0.70 | 292 | 85 | 2.0 | 16.0 | 7.0 |
| 20 | 0.75 | 281 | 120 | 2.2 | 17.0 | 7.0 |

COMPARATIVE EXAMPLE 5

The polymerization of Example 16 was repeated, except that the combination of the monomers used at the individual stages of polymerization was varied to a combination of 320 g. of styrene as the first stage monomer with 80 g. of butadiene as the second stage monomer, to obtain a block copolymer in a yield of 98.8%. The thus obtained copolymer was treated in the same manner as in Example 16 to prepare a test piece, which was then measured in physical properties to obtain the results shown in Table 18.

Table 18

| Intrinsic viscosity (dl/g) | 0.65 |
|---|---|
| Tensile strength (kg/cm²) | 330 |
| Elongation (%) | 11 |
| Izod impact strength, | |
| with notch (kg.cm/cm²) | 1.7 |
| without notch (kg.cm/cm²) | 8.5 |
| Haze value (%) | 9.0 |

As is clear from Table 18, it is understood that the 3-blocked copolymer having at the center a polymer block of the vinyl aromatic compound (styrene) and having at each terminal a polymer block of the conjugated diene (butadiene) is far inferior in mechanical properties to the block copolymer according to the present invention.

What is claimed is:

1. A process for producing a transparent block copolymer resin which comprises subjecting 90 to 65 parts by weight of a vinyl aromatic compound monomer and 10 to 35 parts by weight of a conjugated diene monomer to 3-stage block copolymerization in an inert hydrocarbon solvent using an organo-monolithium compound as an initiator, characterized in that at the first stage of polymerization, a mixture of $S_1$ parts by weight of the vinyl aromatic compound monomer and $B_1$ parts by weight of the conjugated diene monomer is added and substantially all of the monomer mixture is polymerized; at the second stage of polymerization, $S_2$ parts by weight of the vinyl aromatic compound monomer is added and the polymerization is continued to polymerize substantially all of the monomers; and at the third stage of polymerization, a mixture of $S_3$ parts by weight of the vinyl aromatic compound monomer and $B_3$ parts by weight of the conjugted diene monomer is added and the polymerization is continued to polymerize substantially all of the monomers, wherein the feed weight ratios of the individual monomers are controlled to values within the ranges of:

$S_1 + S_2 + S_3 = 90$ to 65 (parts by weight)

$B_1 + B_3 = 10$ to 35 (parts by weight)

$S_1/B_1 = 0.2$ to 3.0

$S_3/B_3 = 0.2$ to 3.0

$S_2/(S_1 + S_2 + S_3) = 0.35$ to 0.90 and the polymerization is effected in the presence of 0.01 to 5 mole % of a Lewis base compound based on the total monomer, to produce a block copolymer resin having an average molecular weight in the range from 0.5 to 1.8 dl/g in terms of intrinsic viscosity as measured in toluene at 30° C.

2. A process for producing a transparent block copolymer resin which comprises subjecting 90 to 65 parts by weight of a vinyl aromatic compound monomer and 10 to 35 parts by weight of a conjugated diene monomer to 2-stage block copolymerization in an inert hydrocarbon solvent using an organo-dilithium compound as an initiator, characterized in that at the first stage of polymerization, $S_1$ parts by weight of the vinyl aromatic compound monomer is added and substantially all of the monomer is polymerized, and then, at the second stage of polymerization, a mixture of $S_2$ parts by weight of the vinyl aromatic compound monomer and B parts by weight of the conjugated diene monomer is added and the polymerization is continued to polymerize substantially all of the monomers, wherein the feed weight ratios of the individual monomers are controlled to values within the ranges of:

$S_1 + S_2 = 90$ to 65 (parts by weight)

$B = 10$ to 35 (parts by weight)

$S_1/(S_1 + S_2) = 0.35$ to 0.90

$S_2/B = 0.2$ to 3.0 and the polymerization is effected in the presence of 0.01 to 5 mole % of a Lewis base compound based on the total monomer, to produce a block copolymer having an average molecular weight in the range from 0.5 to 1.8 dl/g in terms of intrinsic viscosity as measured in toluene at 30° C.

3. A process according to claim 2, wherein the organo-dilithium compound is one member selected from the group consisting of trimethylene-dilithium, tetramethylene-dilithium, pentamethylene-dilithium, naphthalene-lithium complex, stilbene-lithium complex, diphenyl-lithium complex, oligobutadienyl-dilithium and oligoisoprenyl-dilithium.

4. A process according to claim 3, wherein the organo-dilithium compound is one member selected from the group consisting of oligobutadienyl-dilithium and oligoisoprenyl-dilithium.

5. A process according to claim 2, wherein the organo-dilithium compound is used in a proportion of 0.01 to 1.5 mole % based on the total monomer.

6. A process according to claim 2 wherein the vinyl aromatic compound monomer is one member selected from the group consisting of styrene, α-methylstyrene and vinyltoluene.

7. A process according to claim 3 wherein the vinyl aromatic compound monomer is one member selected from the group consisting of styrene, α-methylstyrene and vinyltoluene.

8. A process according to claim 2 wherein the conjugated diene monomer is one member selected from the group consisting of 1,3-butadiene, isoprene and piperylene.

9. A process according to claim 3 wherein the conjugated diene monomer is one member selected from the group consisting of 1,3-butadiene, isoprene and piperylene.

10. A process according to claim 2 wherein the inert hydrocarbon solvent is a paraffinic, naphthenic or aromatic inert hydrocarbon having 3 to 20 carbon atoms.

11. A process according to claim 3 wherein the inert hydrocarbon solvent is a paraffinic, naphthenic or aromatic inert hydrocarbon having 3 to 20 carbon atoms.

12. A process according to claim 2 wherein the inert hydrocarbon solvent is used in a proportion of 1 to 20 parts by weight per part by weight of the total monomer.

13. A process according to claim 3 wherein the inert hydrocarbon solvent is used in a proportion of 1 to 20 parts by weight per part by weight of the total monomer.

14. A process according to claim 2 wherein the Lewis base compound is an ether compound or a tertiary amine compound.

15. A process according to claim 3 wherein the Lewis base compound is an ether compound or a tertiary amine compound.

16. A process according to claim 2 wherein the Lewis base compound is used in a proportion of 0.05 to 2 mole % based on the total monomer.

17. A process according to claim 3 wherein the Lewis base compound is used in a proportion of 0.05 to 2 mole % based on the total monomer.

18. A process according to claim 2 wherein the organo-monolithium compound is one member selected from the group consisting of ethyllithium, propyllithium, butyllithium, amyllithium, hexyllithium, 2-ethylhexyllithium, cyclohexyllithium, decyllithium, dodecyllithium, phenyllithium, tolyllithium, xylyllithium and naphthyllithium.

19. A process according to claim 2 wherein the organo-monolithium compound is used in a proportion of 0.01 to 1.5 mole % based on the total monomer.

20. A process according to claim 2 wherein the polymerization is effected at a temperature in the range from 20° to 120° C.

21. A process according to claim 3 wherein the polymerization is effected at a temperature in the range from 20° to 120° C.

22. A process according to claim 2 wherein, after completion of the polymerization, the polymerization liquid is contacted with excess of a lower alcohol, or directly heated to dryness, or mixed with steam, thereby removing the solvent to recover the polymer.

23. A process according to claim 3 wherein, after completion of the polymerization, the polymerization liquid is contacted with excess of a lower alcohol, or directly heated to dryness, or mixed with steam, thereby removing the solvent to recover the polymer.

24. Block copolymer resins produced according to claim 2.

25. Block copolymer resins produces according to claim 3.

* * * * *